United States Patent
Gyimesi et al.

(10) Patent No.: US 10,326,813 B2
(45) Date of Patent: Jun. 18, 2019

(54) PROCESSING OF LIVE MULTIMEDIA CONTENT AND/OR DATA STREAMS OVER A COMMUNICATION NETWORK

(71) Applicant: USTREAM, INC., San Francisco, CA (US)

(72) Inventors: Akos Gyimesi, Budapest (HU); Gábor Nyerges, Veresegyház/Pest (HU); Gergely Hodicska, Budapest (HU); József Péter Kapusi, Budapest (HU); Balázs Vida, Pomáz/Pest (HU); József Tamás Ecsédi, Szentes/Csongrád (HU); Gyula Fehér, Budapest (HU); Zoltán Attila Németh, Budapest (HU); Sándor Lovász, Budapest (HU); Dávid Simon, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 15/157,817

(22) Filed: May 18, 2016

(65) Prior Publication Data

US 2016/0344781 A1   Nov. 24, 2016

Related U.S. Application Data

(60) Provisional application No. 62/165,515, filed on May 22, 2015.

(51) Int. Cl.
*H04L 29/06* (2006.01)
*H04L 29/08* (2006.01)

(52) U.S. Cl.
CPC ........ *H04L 65/602* (2013.01); *H04L 65/4084* (2013.01); *H04L 67/2842* (2013.01); *H04L 69/14* (2013.01)

(58) Field of Classification Search
CPC ............... H04L 65/602; H04L 65/4084; H04L 67/2842; H04L 69/14
See application file for complete search history.

(56) References Cited

U.S. PATENT DOCUMENTS

| | | | | |
|---|---|---|---|---|
| 2005/0223107 A1* | 10/2005 | Mine | ................. | H04L 29/06027 709/231 |
| 2007/0256113 A1* | 11/2007 | Esteban | ................... | H04N 7/18 725/139 |
| 2013/0254346 A1* | 9/2013 | McGowan | .............. | H04L 65/60 709/219 |
| 2015/0032851 A1* | 1/2015 | Lieber | ................... | H04L 65/602 709/219 |
| 2016/0285942 A1* | 9/2016 | Funderburk | ....... | H04N 21/2146 |

\* cited by examiner

*Primary Examiner* — John M Macilwinen
(74) *Attorney, Agent, or Firm* — Schmeiser, Olsen & Watts, LLP; James Nock (57) ABSTRACT

A method and associated device for streaming multimedia data over a communication network. Data associated with live multimedia content is received. Portions of the data are processed into data chunks. Each data chunk is associated with the live multimedia content. A request is received for the live multimedia content. The data chunks associated with the live multimedia content are transmitted over the communication network, in response to the request for the live multimedia content.

20 Claims, 4 Drawing Sheets

PROCESSING OF LIVE MULTIMEDIA CONTENT AND/OR DATA STREAMS OVER A COMMUNICATION NETWORK

The present invention claims priority to U.S. Provisional No. 62/165,515, filed on May 22, 2015, which is incorporated herein by reference in its entirety.

TECHNICAL FIELD

The present disclosure relates to content (e.g., data) delivery over a communication network, and more particularly, to processing live multimedia content and/or data streams to be used in live, buffered, and fully recorded contexts.

BACKGROUND

Streaming multimedia content and/or data live over a communication network, especially when large scales of users may subscribe to and request content and/or data, presents a number of obstacles such as network outages, connectivity issues, unusual ingest formats, temporary breaks in stream, and the like. Robust content delivery techniques that are scalable, resilient against network or device glitches, breaks in a broadcast stream, connectivity issues, and the like, while also minimizing errors in underlying content such as unsynchronized audio and visual elements in video, shortened recordings (cut off at the end or beginning), recordings split into multiple files, and the like, exist in the context of live streaming, but do not also address such errors in connection with buffering of such streams for later, limited time-delayed (DVR, or digital video recording) access or in connection with full recording for later VOD (video-on-demand) access.

Further, recording multimedia data in traditional content delivery systems typically requires a broadcast to end (e.g., terminate) before any recording of the broadcast can be accessed or manipulated, which is especially bothersome in the case of very long broadcasts. For example, highlight videos cannot be created while a live-streamed sports match is still going. The broadcaster, using a traditional content delivery system, either has to stop and restart ingesting, which risks losing portions of the broadcast, or wait until the end of the broadcast for editing, which detracts from the immediacy of live video.

Moreover, traditional content delivery systems create and store differently formatted content and/or data for each specific supported client format (Mac, Windows, Android, iOS, and the like), and often must store such content and/or data in chunks of multiple sizes or lengths based on storage optimization considerations or format requirements (for example, three-second long video chunks in a proprietary format optimized for storage, and five-second long video chunks in MPEG-TS format for use with iOS clients), which takes up computing resources for transcoding as well as storage space, since multiple versions of the same content must be created and stored. For example, in certain instances, broadcasters may create/store multiple versions of the same VOD content with different QoS parameters (e.g., bit rates, etc.) specific to a type of requesting client device in order to properly serve the requesting client device; e.g., a mobile device may have different QoS parameters than a large television.

From a service provider point of view, merely introducing a separate recording architecture (e.g., limited time-delayed (DVR, or digital video recording) access, full recording for later VOD (video-on-demand), etc.) to a live content delivery system is not ideal. For example, introducing a separate recording architecture to a live streaming system, including buffering and/or recording architectures, may result in increasing a number of possible errors.

SUMMARY

The present invention provides a method, and associated system, device and computer program product, for streaming multimedia data over a communication network. One or more processors receive data associated with live multimedia content. The one or more processors process portions of the received data into data chunks. The one or more processors associate each data chunk with the live multimedia content. The one or more processors receive a request for the live multimedia content. The one or more processors transmit the data chunks associated with the live multimedia content over the communication network, in response to the request for the live multimedia content.

The present invention provides techniques to unify multimedia processes (e.g., ingest, store, serve, etc.) for streaming multimedia content, including but not limited to live content such as a live broadcast, buffered content such as digital video recording (DVR), recorded content such as video on demand (VOD), and the like. These techniques particularly blur the line between live, buffered, and recorded content delivery and overcome obstacles presented by conventional multimedia data streaming (e.g., glitches during a live stream, processing or transforming multimedia content into different formats, etc.) and minimize errors in underlying content (e.g., unsynchronized audio and visual elements in video, shortened recordings (e.g., cut off at the end, cut off at the beginning, etc.), recordings split into multiple files, etc.). Moreover, the techniques of the present invention facilitate and enable dynamic editing (splicing different portions together, combining portions with other existing multimedia content and/or data, adding data to different portions, highlighting portions, and the like) of multimedia content without waiting for completion of a streaming transmission or waiting for multimedia content to be uploaded to a video management system. Further, the system architecture of the present invention avoids increasing the number of possible errors arising from bolting on a separate buffering and/or recording architecture to the content delivery system.

BRIEF DESCRIPTION OF THE DRAWINGS

So that those skilled in the art will readily understand how to make and use the devices and methods of the subject disclosure without undue experimentation, embodiments of the present invention are described in detail herein with reference to certain figures.

DETAILED DESCRIPTION

Figure 1:
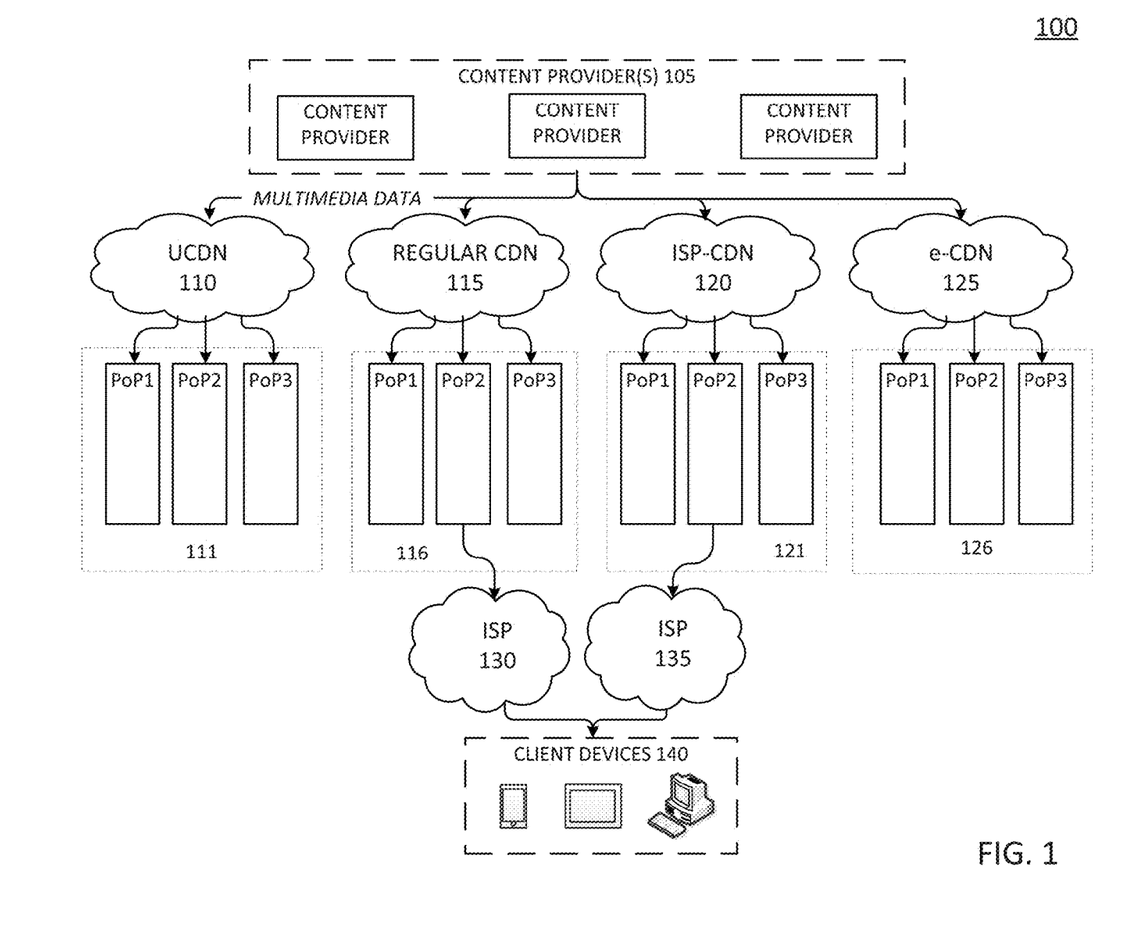
FIG. 1 illustrates an example communication network, in accordance with embodiments of the present invention.

FIG. 1 illustrates an example communication network 100, in accordance with embodiments of the present invention. Communication network 100 illustratively shows content providers 105 as well as a geographically distributed collection of sub-networks, including various Content Delivery Networks (CDNs) (e.g., UCDN 110, Regular CDN 115, ISP-CDN 120, and eCDN 125), corresponding Point of Presence (PoP) servers (e.g., PoPs 111, PoPs 116, PoPs 121, and PoPs 126), and two Internet Service Provider (ISP) networks (e.g., ISP 130 and ISP 135), and client devices 140 (e.g., customers, subscribers, etc.).

As described above, CDNs provide a valuable resource for content providers to meet ever increasing demand for digital content over corresponding communication networks. CDNs, such as those shown in communication 100, locally store and serve requested content to end users (e.g., at client devices 140). For example, operatively, content providers 105 (e.g., media companies, e-commerce vendors, etc.) contract with CDN operators (e.g., operators of CDN 110, 115, 120, 125, etc.) to deliver the content providers' content to a requesting end-user (e.g., client devices 140). The CDN provider, in turn, contracts with one or more ISPs (e.g., ISP 130, 135, etc.), carriers, and network operators to hosting the content providers' servers in their (i.e., the ISPs, carriers, network operators) data centers. In this fashion, CDNs improve performance, availability for content, and also offload network traffic served directly from the content provider's origin infrastructure, resulting in potential cost savings for the content provider.

Requests for content or data from client devices 140 are typically directed to network nodes or devices in an "optimal" fashion. Optimal may be measured by choosing locations, relative to a requesting client device, that is the fewest hops to a CDN, providing lower network latency (e.g., a least number of network seconds away between a requesting client and a corresponding CDN), and the like. Various optimizing logic chooses which metric will be used to base a decision upon. For example, even though a client device or destination node may be physically closest to a CDN or source node, the network latency (e.g., in network seconds) can be high. Similarly, a client device may be located at a least number of hops away from a CDN (in close network proximity), but the client device may still be very far (in geo-proximity) from the CDN, which can also result in a high network latency. Additional optimal characteristics can also include a highest availability of the CDN in terms of server performance (both current and historical), so as to optimize delivery across local networks. Alternatively, optimal can be measured as cost, whereby locations that are least expensive to server content can be a factor in choosing the network. These various metrics may be balanced to provide optimal performance for content delivery to client devices.

Still referring to FIG. 1, PoPs 111, 116, 121 and 126, sometimes referred to as "edges" or "edge network nodes/devices", facilitate content transfer from respective CDNs to ISP 130 and/or ISP 135. Notably, PoPs typically represent the closest "edge" from the perspective of an end-user or client device relative to CDN assets or content. CDNs 110, 115, 120, and 125 provide services to corresponding PoPs depending on, for example, geographic coverage.

When a client device requests content from one of content providers 105, the client device is re-directed to a local CDN, such as ISP-CDN 120. For example, the request is routed through the client device's ISP network (e.g., ISP 135), corresponding PoPs, and onward to a corresponding CDN. Various other network devices or nodes facilitate this process (e.g., routers, switches, Domain Name Service (DNS) nodes, and the like); however, for purposes of simplicity, such other devices or nodes are not shown. A CDN such as ISP-CDN 120 receives the request from the client device and, in response, provides the content to the client device (again, through corresponding PoP(s), ISP(s), etc.).

Notably, communication network 100 is shown for purposes of simplicity, not limitation. For example, as is appreciated by those skilled in the art, the devices and networks shown are interconnected by various communication links (e.g., wired, wireless, etc.) and segments for transporting data, which further support various methods for communication and communication protocols. Further, the networks and sub-networks shown in FIG. 1 can represent many different types of networks (e.g., ranging from local area networks (LANs) to wide area networks (WANs)). It is appreciated that any number of devices, networks, links, etc. may be used in the communication network 100 and further, each of the sub-networks can include or exclude any number of devices or nodes (e.g., switches, routers, etc.), as appropriate.

Figure 2:
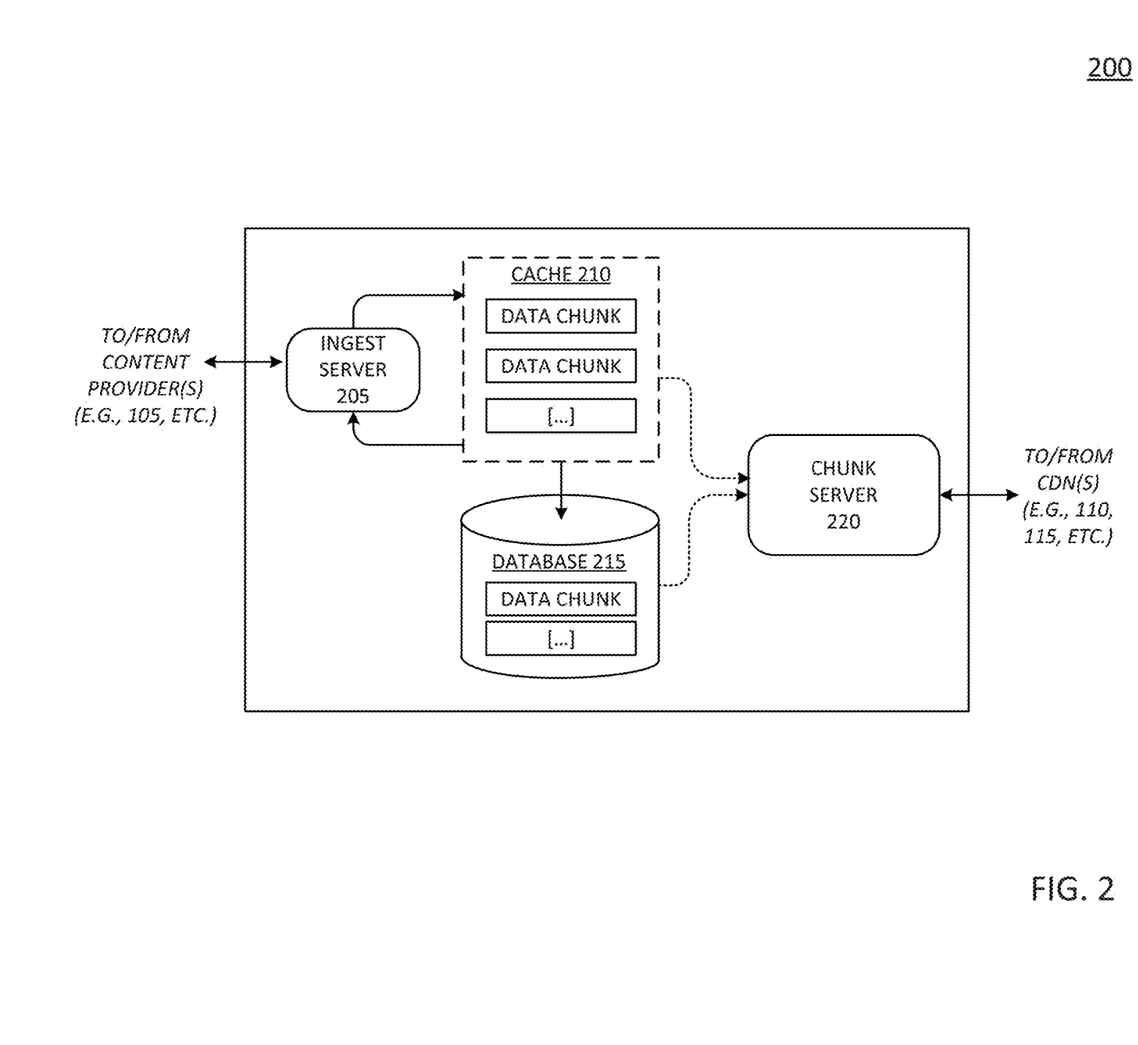
FIG. 2 illustrates an example schematic block diagram of a chunk processing architecture, in accordance with embodiments of the present invention.

FIG. 2 illustrates a schematic block diagram of a chunk processing architecture 200, in accordance with embodiments of the present invention. Chunk processing architecture 200 provides a unified multimedia process (e.g., ingest, store, serve, etc.) for streaming multimedia content (e.g., live broadcast, DVR, VOD, etc.). As shown, chunk processing architecture 200 processes (e.g., ingests, stores, delivers/serves, etc.) multimedia content, and provides multimedia content as a streaming transmission to one or more Content Delivery Networks (e.g., CDN(s) 110, 115 shown in FIG. 1). Chunk processing architecture 200 includes an ingest server 205, a cache 210 to temporarily store one or more data chunks, a database 215 for long term storage, and a chunk server 220.

Operationally, ingest server 205 receives multimedia content from content providers. As discussed above, the multimedia content can include, for example, live broadcast content. Ingest server 205 may execute a chunk application to process (e.g., break up) the streaming multimedia content into smaller data chunks. Data chunks, as used herein, refer to a fragment of data used in various multimedia formats (e.g., flash video, (FLV), MPEG4, PNG, IFF, MP3, AVI, etc.). The data chunks may be stored in cache 210 (e.g., local to ingest server 205) for short term storage and in database 215 for long term storage (e.g., external storage, distributed storage, etc.). When chunk server 220 receives multimedia content requests from CDNs (which receive requests from client devices), chunk server 220 converts data chunks corresponding to the request into an appropriate format for the client device (e.g., FLV, etc.), and transmits the corresponding data chunks to the CDNs for delivery to the client device.

The data chunks may be stored in a universal or unified format to facilitate efficient processing by chunk server 220 when, for example, chunk server 220 converts data chunks into an appropriate format for respective client devices. In addition, in certain embodiments, ingest server 205 and/or chunk server 220 are configured to change a chunk size on demand for any output format. Significantly, changing the chunk size on demand for output formats divorces storage size requirements from transmission and/or streaming size requirements. For example, a stored chunk size can include three second long chunks (e.g., in the universal or unified format), while streaming chunks for HTTP (e.g., MPEG TS for iOS transmission, etc.) can include five second long chunks. Accordingly, chunk server 220 can convert such three second long chunks to the output format of five second long chunks on demand. Notably, the data chunks may be associated with a particular multimedia identifier (e.g., a broadcast) such as an index file, which may be specified in a request for content. Further, each of the data chunks for a particular index file may be indexed or otherwise associated with a time relative to the multimedia content.

Ingest server 205 also processes multimedia content from video content in the same fashion (e.g., into data chunks) as live broadcast content, which obviates the need for additional recording devices. In this fashion, multimedia content for either video or live broadcast is processed and delivered in the same way (e.g., requesting an appropriate subset of data chunks for an index file). Further, creating a video on demand (VOD) is as easy as specifying the data chunks in an index file. Chunk processing architecture 200 also ensures that any processed VOD is an exact replica of a live stream, since the data chunks for the VOD includes the same data chunks as the live stream. Additionally, much less storage space is needed by storing only one set of data chunks for later format conversion instead of storing multiple videos with various formats. In this fashion, specific video formats can be created dynamically, in real-time and on-demand, thus preserving resources (e.g., the processing is only performed when requested). Moreover, a late-joining viewer does not have to start watching a multimedia content stream mid-live or even wait for the end of a live stream broadcast and subsequent upload of (an edited) recording. Instead, multimedia data chunks for the live stream broadcast index file can be accessed and viewed on delay similar to DVR recordings. Thus, chunk processing architecture 200 blurs the lines between live, DVR and video-on-demand content.

Figure 3:
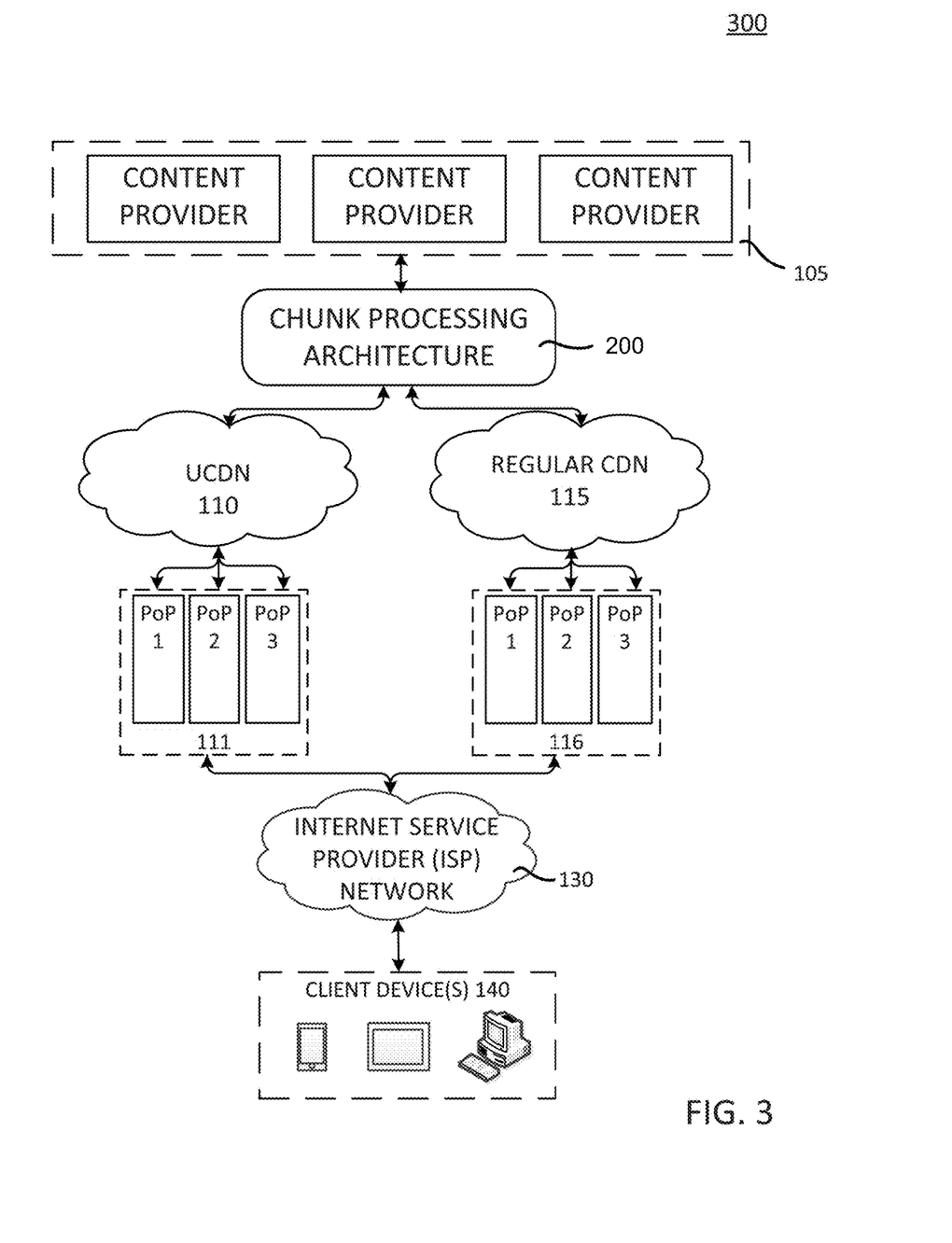
FIG. 3 illustrates another example view of a communication network, in accordance with embodiments of the present invention.

FIG. 3 illustrates an example communication network 300, in accordance with embodiments of the present invention. The communication network 300 includes content providers 105, chunk processing architecture 200, UCDN 110, regular CDN 115, corresponding PoPs 111 and 116, ISP 130 and client devices 140. As shown, chunk processing architecture is positioned between the CDNs (UCDN 110 and regular CDN 115) and content providers 105.

Chunk processing architecture 200 may be deployed as a software framework instantiated as a dynamic, request based response. That is, chunk processing architecture 200 can be incorporated within application servers in the content networks and/or the CDN networks. When a CDN and/or content provider receives a request for multimedia content, the CDN and/or content provider can instantiate the resources required for the chunk processing architecture 200 to process the requested multimedia data as data chunks, as discussed above. In this fashion, the chunk processing architecture 200 is scalable and can be instantiated multiple times as a distributed processing architecture to process large volumes of requests for multimedia content.

Figure 4:
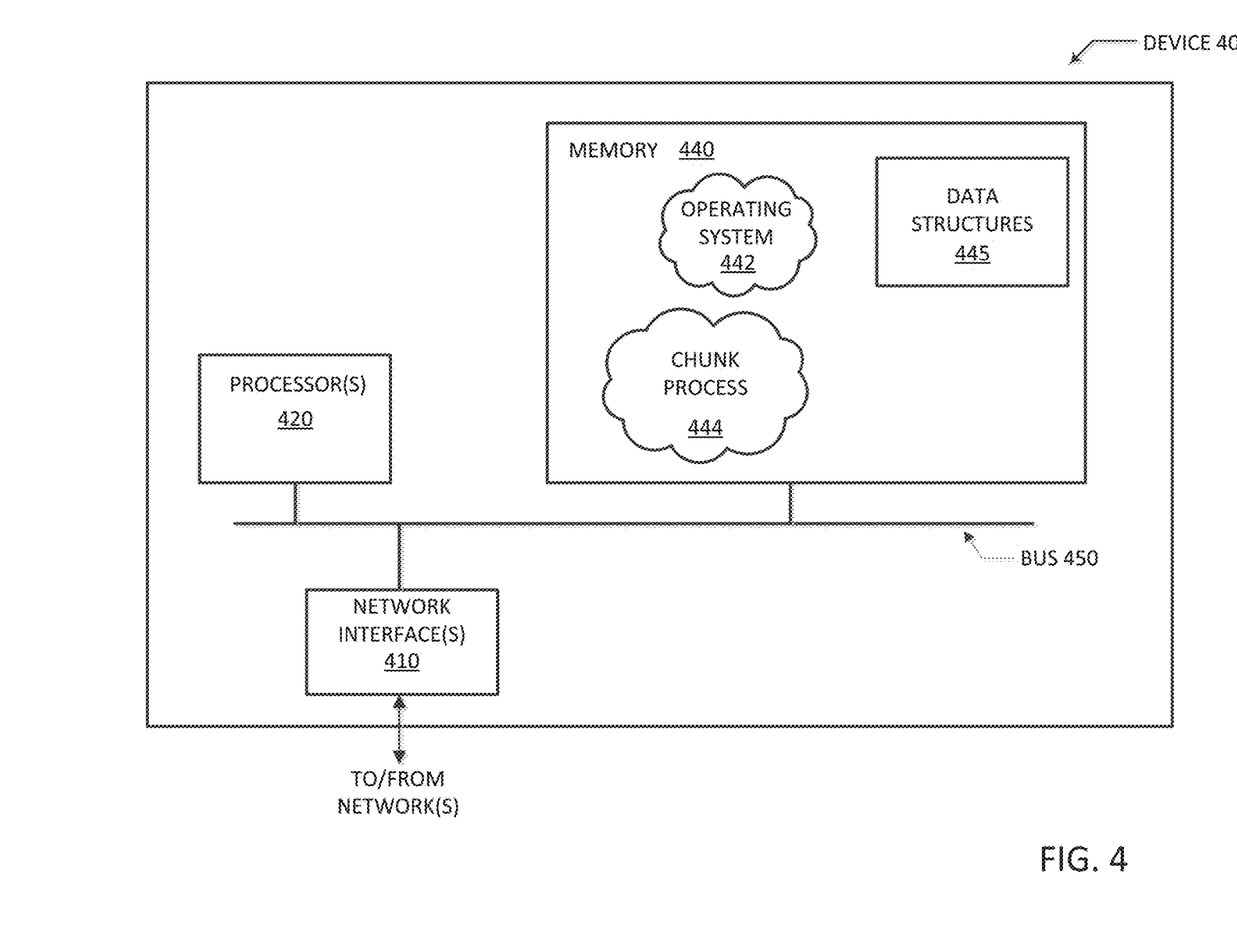
FIG. 4 illustrates an example server device in the communication network shown in FIG. 3, in accordance with embodiments of the present invention.

FIG. 4 illustrates an example server device 400 in the communication network 300 shown in FIG. 3, in accordance with embodiments of the present invention. The communication network 300 may be used with one or more embodiments described herein, (e.g., a device employing chunk process or chunk processing architecture 200). Server device 400 includes one or more network interfaces 410, at least one processor 420 (e.g., a hardware controller/processor), and a memory 440 interconnected by a system bus 450.

Network interface(s) 410 contain the mechanical, electrical, and signaling circuitry for communicating data over physical and/or wireless links coupled to one or more CDNs, content provider networks, and the like. Network interfaces 410 may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, Real Time Messaging Protocols (RTMP), a Real Time Streaming Protocols (RTSP), a Hypertext Transfer Protocols (HTTP), and HTTP Live Streaming (HLS) Protocols, etc.

Memory 440 comprises a plurality of storage locations that are addressable by the processor 420 and network interfaces 410 for storing software programs and data structures associated with the embodiments described herein. Certain embodiments of server device 400 may include limited memory or no memory (e.g., no memory for storage other than for programs/processes operating on the server device 400). Processor 420 includes necessary elements or logic adapted to execute the software programs and manipulate data structures 445.

An operating system 442, portions of which are typically resident in memory 440 and executed by the processor 420, functionally organizes the device by, inter alia, invoking operations in support of software processes and/or services executing on the server device 400. For example, these software processes and/or services may comprise chunk process/services 444. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the chunk process 444, which may contain computer executable instructions executed by the processor 420 (or independent processor of interfaces 410) to perform functions relating to the techniques described herein.

Chunk process 444, when employed by server device 400, operatively processes multimedia content, including ingesting, breaking multimedia content into data chunks, indexing, storing, and the like. For example, as discussed in greater detail above, chunk process 444 operates to achieve chunk processing architecture 200.

The techniques described herein, therefore, provide for processing multimedia content, particularly for both live streaming broadcasts as well as buffered or recorded video content, for content and/or data transfer networks, including CDNs. These techniques provide for simplified, but efficient multimedia processing using a chunk architecture. Such techniques can be employed by, for example, application servers associated with content and/or data transfer networks and may further be instantiated on-demand.

While there have been shown and described illustrative embodiments for processing multimedia content, it is to be understood that various other adaptations and modifications may be made within the spirit and scope of the embodiments herein. For example, the embodiments have been shown and described herein with relation to particular CDNs, ISP networks, etc. However, the embodiments in their broader sense are not as limited, and may, in fact, be used with any number of networks, client devices, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes one or more computer readable hardware storage devices having computer readable program code stored therein, said program code containing instructions executable by one or more processors of a device or computer system to implement the methods of the present invention.

A computer or computer system (e.g., server device 400) of the present invention includes one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for streaming multimedia data over a communication network, said method comprising:
    directly receiving, from a content provider by an ingest server of a chunk processing architecture via one or more processors, live multimedia content being broadcast by the content provider;
    dividing, by the ingest server via the one or more processors, the received live multimedia content into multiple data chunks, said dividing comprising generating the multiple data chunks in real time as the live multimedia content is being received, said generated multiple data chunks collectively comprising the live multimedia content, each generated data chunk of the multiple data chunks having a first chunk size;
    associating, by a chunk server of the chunk processing architecture via the one or more processors, each data chunk having the first chunk size with a respective portion of the live multimedia content, said ingest server and said chunk server being different hardware servers within the chunk processing architecture;
    indexing, by the ingest server via the one or more processors, each data chunk having the first chunk size according to a time associated with the live multimedia content such that each data chunk having the first chunk size is associated with a unique time at which each data chunk having the first chunk size begins;
    storing, by the chunk processing architecture via the one or more processors, the data chunks having the first chunk size in a storage within the chunk processing architecture in real time as the data chunks having the first chunk size are being generated, said storage being a database or a cache;
    at a current time during said receiving the live multimedia content and during said storing the data chunks having the first chunk size, directly receiving, by the chunk server from a Content Delivery Network (CDN) via the one or more processors, a request for the live multimedia content starting at one stored data chunk having the first chunk size that begins at a prior time that precedes the current time, said receiving the request by the chunk server having occurred after the CDN had received the request originating from a client device;
    in response to said receiving the request by the chunk server, converting by the chunk server via the one or more processors, the stored data chunks having the first chunk size, starting at the one stored data chunk, to a plurality of data chunks having a second chunk size that differs from the first chunk size; and
    directly transmitting, by the chunk server to the CDN via the one or more processors, the data chunks having the second chunk size, for subsequent transmission of the data chunks having the second chunk size from the CDN to the client device over the communication network.

2. The method of claim 1, wherein said storing the data chunks having the first chunk size comprises storing the data chucks having the first chunk size in the storage in a universal or unified format independent of a format and a size associated with the client device that requested the multimedia content.

3. The method of claim 2, wherein the transmitted data chunks having the second chunk size comprise different, non-contiguous portions of the live multimedia content spliced together.

4. The method of claim 1, said method further comprising:
instantiating, by the one or more processors, resources required for processing the requested live multimedia content, in response to the request for the live multimedia content.

5. The method of claim 1, wherein the live multimedia content is live video content.

6. The method of claim 1, wherein the prior time of the one stored data chunk having the first chunk size is at an earlier time than the time to which any other data chunk of the stored data chunks having the first chunk size is associated.

7. The method of claim 1, wherein the prior time of the one stored data chunk having the first chunk size is later than the time to which at least one other data chunk of the stored data chunks having the first chunk size is associated.

8. A computer system, comprising one or more processors and one or more computer readable hardware storage devices, said one or more hardware storage devices containing program code executable by the one or more processors to implement a method for streaming multimedia data over a communication network, said method comprising:
directly receiving, from a content provider by an ingest server of a chunk processing architecture via one or more processors, live multimedia content being broadcast by the content provider;
dividing, by the ingest server via the one or more processors, the received live multimedia content into multiple data chunks, said dividing comprising generating the multiple data chunks in real time as the live multimedia content is being received, said generated multiple data chunks collectively comprising the live multimedia content, each generated data chunk of the multiple data chunks having a first chunk size;
associating, by a chunk server of the chunk processing architecture via the one or more processors, each data chunk having the first chunk size with a respective portion of the live multimedia content, said ingest server and said chunk server being different hardware servers within the chunk processing architecture;
indexing, by the ingest server via the one or more processors, each data chunk having the first chunk size according to a time associated with the live multimedia content such that each data chunk having the first chunk size is associated with a unique time at which each data chunk having the first chunk size begins;
storing, by the chunk processing architecture via the one or more processors, the data chunks having the first chunk size in a storage within the chunk processing architecture in real time as the data chunks having the first chunk size are being generated, said storage being a database or a cache;
at a current time during said receiving the live multimedia content and during said storing the data chunks having the first chunk size, directly receiving, by the chunk server from a Content Delivery Network (CDN) via the one or more processors, a request for the live multimedia content starting at one stored data chunk having the first chunk size that begins at a prior time that precedes the current time, said receiving the request by the chunk server having occurred after the CDN had received the request originating from a client device;
in response to said receiving the request by the chunk server, converting by the chunk server via the one or more processors, the stored data chunks having the first chunk size, starting at the one stored data chunk, to a plurality of data chunks having a second chunk size that differs from the first chunk size; and
directly transmitting, by the chunk server to the CDN via the one or more processors, the data chunks having the second chunk size, for subsequent transmission of the data chunks having the second chunk size from the CDN to the client device over the communication network.

9. The computer system of claim 8, wherein said storing the data chunks having the first chunk size comprises storing the data chucks having the first chunk size in the storage in a universal or unified format independent of a format and a size associated with the client device that requested the multimedia content.

10. The computer system of claim 9, wherein the transmitted data chunks having the second chunk size comprise different, non-contiguous portions of the live multimedia content spliced together.

11. The computer system of claim 8, said method further comprising:
instantiating, by the one or more processors, resources required for processing the requested live multimedia content, in response to the request for the live multimedia content.

12. The computer system of claim 8, wherein the live multimedia content is live video content.

13. The computer system of claim 8, wherein the prior time of the one stored data chunk having the first chunk size is at an earlier time than the time to which any other data chunk of the stored data chunks having the first chunk size is associated.

14. The computer system of claim 8, wherein the prior time of the one stored data chunk having the first chunk size is later than the time to which at least one other data chunk of the stored data chunks having the first chunk size is associated.

15. A computer program product, comprising one or more computer readable hardware storage devices having computer readable program code stored therein, said program code containing instructions executable by one or more processors to implement a method for streaming multimedia data over a communication network, said method comprising:
directly receiving, from a content provider by an ingest server of a chunk processing architecture via one or more processors, live multimedia content being broadcast by the content provider;
dividing, by the ingest server via the one or more processors, the received live multimedia content into multiple data chunks, said dividing comprising generating the multiple data chunks in real time as the live multimedia content is being received, said generated multiple data chunks collectively comprising the live multimedia content, each generated data chunk of the multiple data chunks having a first chunk size;
associating, by a chunk server of the chunk processing architecture via the one or more processors, each data chunk having the first chunk size with a respective portion of the live multimedia content, said ingest server and said chunk server being different hardware servers within the chunk processing architecture;
indexing, by the ingest server via the one or more processors, each data chunk having the first chunk size according to a time associated with the live multimedia content such that each data chunk having the first chunk size is associated with a unique time at which each data chunk having the first chunk size begins;

storing, by the chunk processing architecture via the one or more processors, the data chunks having the first chunk size in a storage within the chunk processing architecture in real time as the data chunks having the first chunk size are being generated, said storage being a database or a cache;

at a current time during said receiving the live multimedia content and during said storing the data chunks having the first chunk size, directly receiving, by the chunk server from a Content Delivery Network (CDN) via the one or more processors, a request for the live multimedia content starting at one stored data chunk having the first chunk size that begins at a prior time that precedes the current time, said receiving the request by the chunk server having occurred after the CDN had received the request originating from a client device;

in response to said receiving the request by the chunk server, converting by the chunk server via the one or more processors, the stored data chunks having the first chunk size, starting at the one stored data chunk, to a plurality of data chunks having a second chunk size that differs from the first chunk size; and directly transmitting, by the chunk server to the CDN via the one or more processors, the data chunks having the second chunk size, for subsequent transmission of the data chunks having the second chunk size from the CDN to the client device over the communication network.

16. The computer program product of claim 15, wherein said storing the data chunks having the first chunk size comprises storing the data chucks having the first chunk size in the storage in a universal or unified format independent of a format and a size associated with the client device that requested the multimedia content.

17. The computer program product of claim 15, said method further comprising:

instantiating, by the one or more processors, resources required for processing the requested live multimedia content, in response to the request for the live multimedia content.

18. The computer program product of claim 15, wherein the live multimedia content is live video content.

19. The computer program product of claim 15, wherein the prior time of the one stored data chunk having the first chunk size is at an earlier time than the time to which any other data chunk of the stored data chunks having the first chunk size is associated.

20. The computer program product of claim 15, wherein the prior time of the one stored data chunk having the first chunk size is later than the time to which at least one other data chunk of the stored data chunks having the first chunk size is associated.

* * * * *